US010805017B2

(12) United States Patent
Chervyakov et al.

(10) Patent No.: US 10,805,017 B2
(45) Date of Patent: Oct. 13, 2020

(54) TECHNIQUES IN NEW RADIO (NR) USER EQUIPMENT (UE) DEMODULATION OVER THE AIR (OTA) TESTS

(71) Applicant: Apple Inc., Cupertino, CA (US)

(72) Inventors: Andrey Chervyakov, Nizhny Novgorod (RU); Alexei Davydov, Nizhny Novgorod (RU); Yang Tang, San Jose, CA (US); Anatoliy Ioffe, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/148,905

(22) Filed: Oct. 1, 2018

(65) Prior Publication Data

US 2019/0052376 A1     Feb. 14, 2019

Related U.S. Application Data

(60) Provisional application No. 62/632,100, filed on Feb. 19, 2018, provisional application No. 62/567,204, filed on Oct. 2, 2017.

(51) Int. Cl.
H04B 17/29     (2015.01)
H04B 17/318    (2015.01)
(Continued)

(52) U.S. Cl.
CPC ............. *H04B 17/29* (2015.01); *H04B 17/18* (2015.01); *H04B 17/318* (2015.01); *H04W 24/06* (2013.01); *H04W 24/10* (2013.01)

(58) Field of Classification Search
CPC ...... H04B 17/18; H04B 17/29; H04B 17/318; H04B 24/06; H04B 24/10
(Continued)

(56) References Cited

U.S. PATENT DOCUMENTS 10,003,418 B1 *  6/2018  Yellapantula ....... H04W 52/242
2014/0334564 A1  11/2014  Singh et al.
(Continued)

FOREIGN PATENT DOCUMENTS

WO     2016/153120 A1     9/2016
WO     2017/067138 A1     4/2017
(Continued)

OTHER PUBLICATIONS

3GPP, "Technical Specification Group Radio Access Network; Study on test methods for New Radio; (Release 15)," 3GPP TR 38.810 V2.3.0 (Aug. 2018), 5G, 94 pages.
(Continued)

*Primary Examiner* — Lee Nguyen
(74) *Attorney, Agent, or Firm* — Sterne, Kessler, Goldstein & Fox P.L.L.C.

(57) ABSTRACT

Embodiments of the present disclosure describe methods, apparatuses, storage media, and systems for UE baseband-demodulation-performance tests in new radio (NR). An over-the-air (OTA) test environment with optimized signaling over the test interface by enabling feedback in the test system may achieve adequate baseband emulation of multipath utilizing NR reference signals. Various embodiments describe how to realize a test loop initialization and achieve better test certainty and controllability over OTA tests.

20 Claims, 7 Drawing Sheets

(51) Int. Cl.
*H04B 17/18* (2015.01)
*H04W 24/10* (2009.01)
*H04W 24/06* (2009.01)

(58) Field of Classification Search
USPC .......................................... 455/67.11–67.14
See application file for complete search history.

(56) References Cited

U.S. PATENT DOCUMENTS

| | | | |
|---|---|---|---|
| 2016/0013878 A1* | 1/2016 | Zhao | H04L 25/03968 370/329 |
| 2018/0054244 A1 | 2/2018 | Kim et al. | |
| 2018/0255472 A1* | 9/2018 | Chendamarai Kannan | H04W 24/08 |

FOREIGN PATENT DOCUMENTS

| | | |
|---|---|---|
| WO | 2017/080132 A1 | 5/2017 |
| WO | 2017/082810 A1 | 5/2017 |
| WO | 2018/222931 A1 | 12/2018 |

OTHER PUBLICATIONS

ETSI, "5G; NR; Physical layer measurement," (3GPP TS 38.215 version 15.2.0 Release 15), ETSI TS 138 215 V15.2.0 (Jul. 2018), 18 pages.
Intel Corporation et al., New SID on Study on test methods for New Radio, 3GPP TSG RAN Meeting #77, RP-171828, Agenda Item: 9.3.9, (revision of RP-171021), Sep. 11-14, 2017, Sapporo, Japan, 4 pages.
Intel et al., "WF on performance testing for FR2," 3GPP TSG-RAN WG4 NR Adhoc 1801, R4-1801288, Agenda item: 4.7.6, Jan. 22-26, 2018, San Diego, USA, 3 pages.
Intel et al., "Technical Specification Group Radio Access Network; Study on test methods for New Radio; (Release 15)," TR 38.810 V1.0.1, 3GPP TSG-RAN WG4 AH Meeting #1801, R4-1700341, Agenda item: 4.7.1, Jan. 22-26, 2018, San Diego, USA, 33 pages.
3GPP, "Technical Specification Group Radio Access Network; NR; Physical layer measurements (Release 15)," 3GPP TS 38.215 V1.0.0 (Sep. 2017), 5G, 10 pages.
U.S Appl. No. 62/401,434, filed Sep. 29, 2016.
3GPP, "Technical Specification Group Radio Access Network; Universal Terrestrial Radio Access (UTRA) and Evolved Universal Terrestrial Radio Access (E-UTRA); Verification of radiated multi-antenna reception performance of User Equipment (UE) (Release 14)," 3GPP TR 37.977 V14.4.0 (Jun. 2017), Lte Advanced Pro, 189 pages.
3GPP, "Technical Specification Group Radio Access Network; Evolved Universal Terrestrial Radio Access (E-UTRA) User Equipment (UE) antenna test function definition for two-stage Multiple Input Multiple Output (MIMO) Over the Air (OTA) test method (Release 13)," 3GPP TR 36.978 V13.2.0 (Jun. 2017), Lte Advanced, 22 pages.
3GPP, "Technical Specification Group Radio Access Network; NR; Physical layer procedures for control (Release 15)," 3GPP TS 38.213 V1.0.0 (Sep. 2017), 5g, 16 pages.
3GPP, "Technical Specification Group Radio Access Network; NR; Physical channels and modulation (Release 15)," 3GPP TS 38.211 V1.0.0 (Sep. 2017), 5G, 37 pages.
International Patent Office—International Search Report and Written Opinion dated Sep. 5, 2018 from International Application No. PCT/US2018/035484, 18 pages.
Qualcomm, "Beam management for NR," 3GPP TSG RAN1 #88, R1-1702604, Agenda Item: 8.1.2.2.1, Feb. 13-17, 2017, Athens, Greece, 8 pages.
3GPP, "Technical Specification Group Radio Access Network; Universal Terrestrial Radio Access (UTRA) and 3GPP, Technical Specification Group Radio Access Network; Universal Terrestrial Radio Access (UTRA) and Evolved Universal Terrestrial Radio Access (E-UTRA); Verification of radiated multi-antenna reception performance of User Equipment (UE) (Release 14)," 3GPP TR 37.977 V14.4.0 (Jun. 2017), Lte Advanced Pro, 189 pages .

\* cited by examiner

TECHNIQUES IN NEW RADIO (NR) USER EQUIPMENT (UE) DEMODULATION OVER THE AIR (OTA) TESTS

CROSS REFERENCE TO RELATED APPLICATION

The present application claims priority to U.S. Provisional Patent Application No. 62/567,204, filed Oct. 2, 2017, entitled "Test Interface for New Radio (NR) User Equipment (UE) Demodulation Over the Air (OTA) Performance Requirements," and U.S. Provisional Patent Application No. 62/632,100, filed Feb. 19, 2018, entitled "User Equipment (UE) Measurements for Demodulation Test Setup in New Radio (NR) Frequency Range 2 (FR2)," all of which are hereby incorporated by reference in its entirety.

FIELD

Embodiments of the present invention relate generally to the technical field of wireless communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Existing user equipment (UE) demodulation performance tests may not be adequate in developing wireless networks. For example, 5G NR (New Radio) wireless communication systems will operate in the millimeter wave (mmWave) frequency range with carrier frequencies above 6 GHz. New solutions are needed for UE demodulation performance tests for mmWave frequency range.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
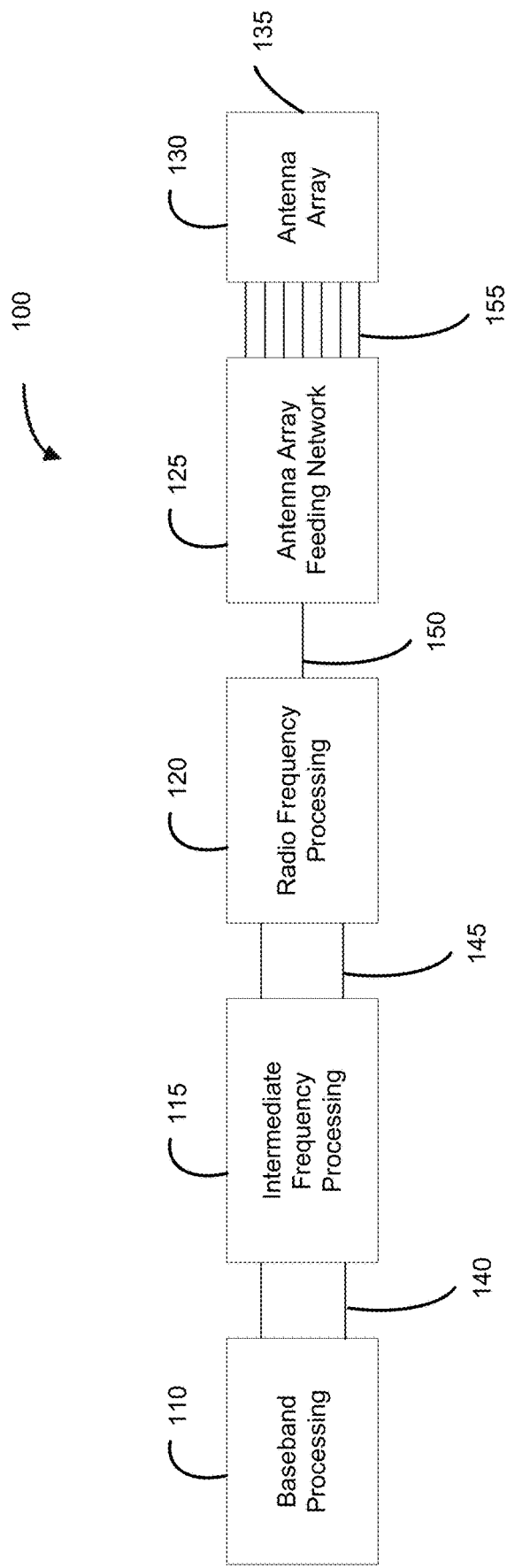
FIG. 1 schematically illustrates an example block diagram of an architecture of a UE operating in compliance with NR standards, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SOC), system in a package (SiP), that provides the described functionality. In some embodiments, the circuitry may execute one or more software or firmware modules to provide the described functions. In some embodiments, circuitry may include logic, at least partially operable in hardware.

5G NR wireless communication systems will operate in multiple frequency ranges including a mmWave frequency range above 6 GHz, for example, NR Frequency Range 2 (FR2) from 24250 MHz to 52600 MHz. In NR communication with respect to mmWave, it is reasonable to expect a greater level of integration of high-frequency devices, for example for devices operating above 6 GHz, than seen today with the Third Generation Partnership Project (3GPP) standard for Long Term Evolution (LTE) devices and NR devices operating in lower frequencies, for example, NR Frequency Range 1 (FR1) from 450 MHz to 6000 MHz. Such highly integrated devices may feature innovative front-end solutions, multi-element antenna arrays, passive and active feeding networks, and so on, that may not allow for the same testing techniques used to verify UE radio frequency (RF), radio resource management (RRM) and demodulation and channel state information (CSI) reporting performance requirements as applied to current LTE devices.

A highly integrated NR device may not be physically accessible by a front-end cable connector to connect to a test equipment (TE), because the interface between the front-end and the antenna may be an antenna-array feeding network, which is tightly integrated and, therefore, precludes the possibility of exposing a test connector, and so on. For example, there may not be access points to a baseband port, because the baseband port may be integrated with RF circuitry, integrated with an RF antenna array through some feeding network, or integrated with intermediate frequency (IF) circuitry. A greater level of integration of high-frequency devices including devices operating above 6 GHz may drive the need for over-the-air (OTA) testing of all 1) UE RF performance requirements, 2) UE RRM performance requirements, and/or 3) UE demodulation and CSI performance requirements (further denoted as UE demodulation without loss of generality). Thus, conventional LTE UE demodulation test setup may not be applicable due to highly integrated realization of UE baseband and RF components. Meanwhile, increased over the air (OTA) propagation losses at higher frequencies, such as above 6 GHz, presents significant challenges for test metric accuracies and device under test (DUT) control. Embodiments described herein may include, for example, apparatuses, methods, and storage media for configuring measurements of, or related to, UE demodulation performance tests in NR communications. Various embodiments described herein may improve OTA test certainty (i.e., reduced measurement uncertainty) and controllability over baseband signal-to-noise ratio (SNR) for UE demodulation tests, and optimize signaling over the test interface by enabling feedback in the test system to achieve adequate baseband emulation of multipath utilizing NR reference signals.

FIG. 1 schematically illustrates an example block diagram of an architecture of a UE 100 operating in compliance with NR standards in accordance with one or more embodiments. The UE 100 may be a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, customer premises equipment (CPE), fixed wireless access (FWA) device, Vehicle mounted UE or any computing device including a wireless communications interface. In some embodiments, the UE 100 can comprise an Internet of Things (IoT) UE, which can comprise a network access layer designed for low-power IoT applications utilizing short-lived UE connections. An IoT UE can utilize technologies such as narrowband IoT (NB-IoT), machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The UE 100 includes baseband processing circuitry 110, IF processing circuitry 115 if applicable, RF processing circuitry 120, an antenna-array matching network 125, and an antenna array 130. Based on the latest NR standards defined by the 3GPP, it is reasonable to expect that all or a vast majority of NR tests will be defined and tested with respect to the OTA measurement reference 135 at the output of antenna array 130.

In some embodiments, baseband processing circuitry 110 may include multiple parallel baseband chains. Each baseband chain may process baseband signals and be the same or substantially similar to the baseband circuitry 204 in FIG. 2. RF processing circuitry 115 may include multiple parallel RF chains or branches corresponding to one or more baseband chains. One baseband chain may be connected with one or more RF chains and one RF chain may be connected with one or more baseband chains, depending on various UE architectures. Each RF chain or branch may be coupled with one antenna-array matching network 125, which may be connected with one or more antenna arrays 130. It is noted that "baseband chain," "baseband branch," and "baseband port" are used interchangeably in this application. A baseband chain may also refer to a receiver branch regarding UE reception.

In some embodiments, the UE 100 may include protocol processing circuitry that may include one or more instances of control circuitry to provide control functions for the baseband processing circuitry 110, IF processing circuitry 115, RF processing circuitry 120, antenna-array feeding network 125, and antenna array(s) 130.

It is noted that in NR operation with respect to mmWave, baseband port 140 may not be accessible to test equipment to conduct a direct baseband-demodulation performance test due to the highly integrated baseband/RF circuitry. Similarly, IF port 145, RF port 150, and antenna element inputs 155 may not have access points either from test equipment point of view. In addition, antenna array 130 may be used in mmWave operation, which means for frequency above 6 GHz. Thus, conductive measurements are not applicable for mmWave NR. Instead, OTA measurement may apply to most of, if not all, NR UE performance measurements in frequency range 2 (FR2). FR2 herein refers to mmWave above 24 GHz.

Figure 2:
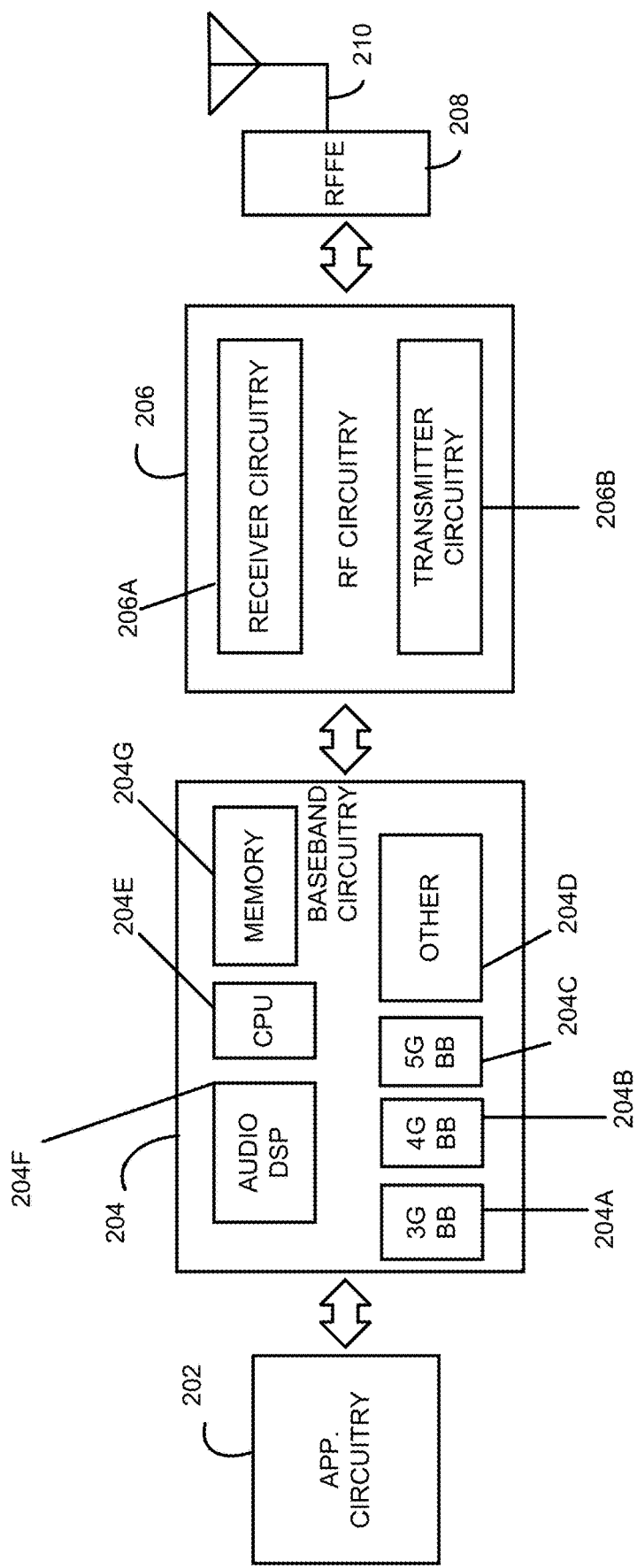
FIG. 2 illustrates example components of a UE in accordance with various embodiments.

FIG. 2 illustrates example components of the UE 100 in accordance with some embodiments. In contrast to FIG. 1, FIG. 2 shows example components of the UE 100 from receiving and transmitting function point of view, and it may not include all of the components described in FIG. 1. In some embodiments, the UE 100 may include application circuitry 202, baseband circuitry 204, RF circuitry 206, RF front-end (RFFE) circuitry 208, and a plurality of antennas 210 together at least as shown. In some embodiments, the UE 100 may include additional elements such as, for example, a memory/storage, display, camera, sensor, or input/output (I/O) interface. In other embodiments, the components described below may be included in more than one device (for example, said circuitry may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processors may include any combination of general-purpose processors and dedicated processors (for example, graphics processors, application processors, etc.). The processors may be coupled with or may include memory/storage and may be configured to execute instructions stored in the memory/storage to enable various applications or operating systems to run on the device 100. In some embodiments, processors of application circuitry 202 may process IP data packets received from an evolved packet core (EPC).

The baseband circuitry 204 may include circuitry such as, but not limited to, one or more single-core or multi-core processors. The baseband circuitry 204 may be similar to and substantially interchangeable with the baseband circuitry 110 in some embodiments. The baseband circuitry 204 may include one or more baseband processors or control logic to process baseband signals received from a receive signal path of the RF circuitry 206 and to generate baseband signals for a transmit signal path of the RF circuitry 206. Baseband circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (for example, second generation (2G), sixth generation (6G), etc.). The baseband circuitry 204 (for example, one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a central processing unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolutional, tail-biting convolutional, convolutional turbo, Viterbi, Polar, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, in a single chipset, or disposed on a same circuit board in some embodiments. In some embodiments, some or all of the constituent components of the baseband circuitry 204 and the application circuitry 202 may be implemented together such as, for example, on a SOC.

In some embodiments, the baseband circuitry 204 may provide for communication compatible with one or more radio technologies. For example, in some embodiments, the baseband circuitry 204 may support communication with an evolved universal terrestrial radio access network (E-UTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. The RF circuitry 206 may be similar to and substantially interchangeable with the RF processing circuitry 120 in some embodiments. In various embodiments, the RF circuitry 206 may include one or more switches, filters, amplifiers, etc. to facilitate the communication with the wireless network. RF circuitry 206 may include receiver circuitry 206A, which may include circuitry to down-convert RF signals received from the RFFE circuitry 208 and provide baseband signals to the baseband circuitry 204. RF circuitry 206 may also include transmitter circuitry 206B, which may include circuitry to up-convert baseband signals provided by the baseband circuitry 204 and provide RF output signals to the RFFE circuitry 208 for transmission.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio integrated circuit (IC) circuitry may be provided for processing signals for each spectrum, although the scope of the embodiments is not limited in this respect.

The RFFE circuitry 208 may include a receive signal path, which may include circuitry configured to operate on RF beams received from one or more antennas. The RF beams may operate in mmWave, sub-mmWave, or microwave frequency range. The RFFE circuitry 208 coupled with the one or more antennas 210 may receive the transmit beams and proceed them to the RF circuitry 206 for further processing. The RFFE circuitry 208 may also include a transmit signal path, which may include circuitry configured to amplify signals for transmission provided by the RF circuitry 206 for transmission by one or more of the antennas 210, with or without beamforming. In various embodiments, the amplification through transmit or receive signal paths may be done solely in the RF circuitry 206, solely in the RFFE circuitry 208, or in both the RF circuitry 206 and the RFFE circuitry 208. The RFFE circuitry 208 may include an antenna-array feeding network similar to and substantially interchangeable with the antenna-array feeding network 125 in some embodiments.

In some embodiments, the RFFE circuitry 208 may include a TX/RX switch to switch between transmit mode and receive mode operation. The RFFE circuitry 208 may include a receive signal path and a transmit signal path. The receive signal path of the RFFE circuitry 208 may include a low noise amplifier (LNA) to amplify received RF beams and provide the amplified received RF signals as an output (for example, to the RF circuitry 206). The transmit signal path of the RFFE circuitry 208 may include a power amplifier (PA) to amplify input RF signals (for example, provided by RF circuitry 206), and one or more filters to generate RF signals for beamforming and subsequent transmission (for example, by one or more of the one or more antennas 210).

Processors of the application circuitry 202 and processors of the baseband circuitry 204 may be used to execute elements of one or more instances of a protocol stack. For example, processors of the baseband circuitry 204, alone or in combination, may be used to execute Layer 3, Layer 2, or Layer 1 functionality, while processors of the application circuitry 202 may utilize data (for example, packet data)

received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE, described in further detail below.

Figure 3:
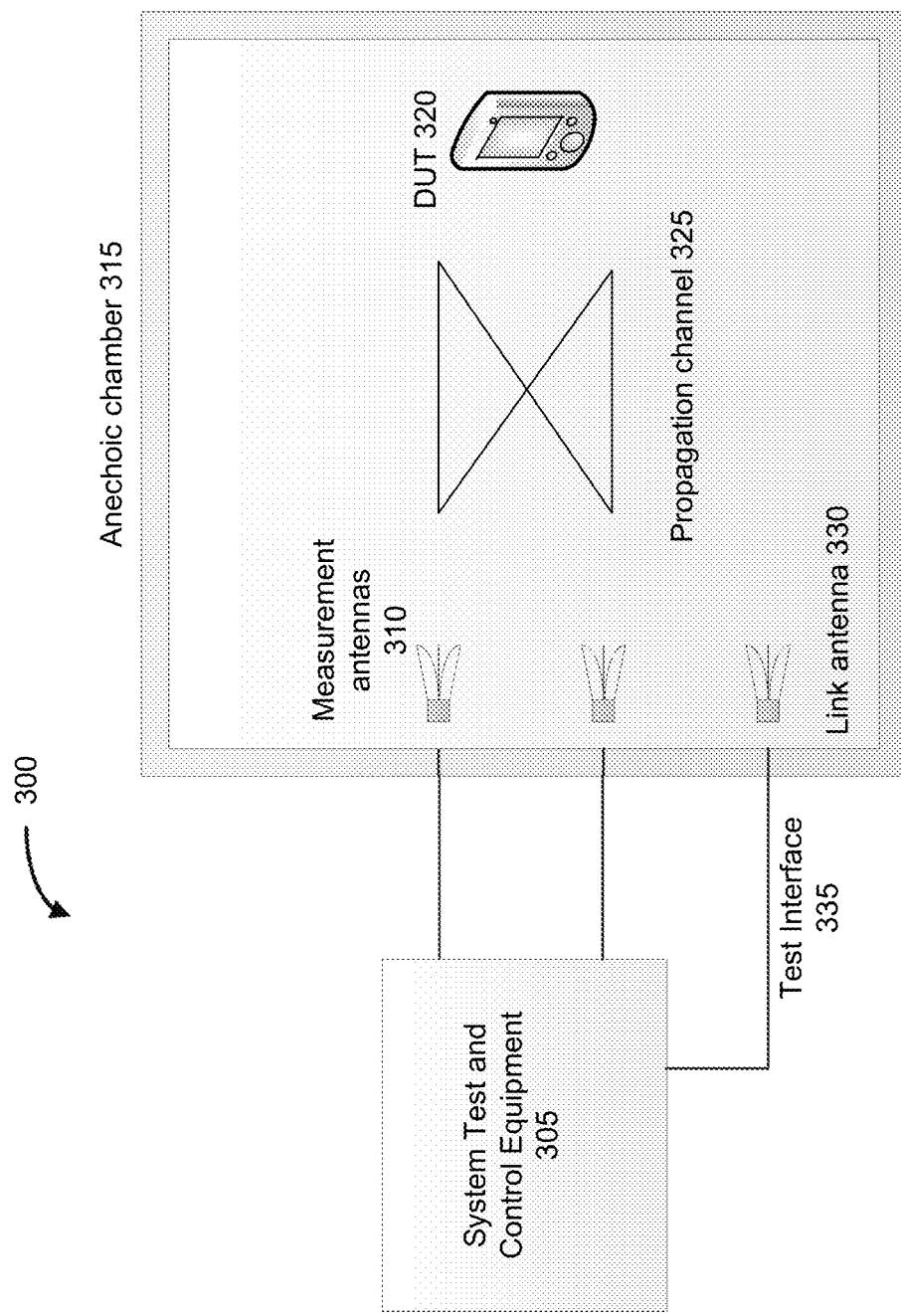
FIG. 3 illustrates an example of an NR demodulation performance test setup.

FIG. 3 illustrates an example of an NR demodulation performance test setup 300. A system test and control equipment 305 (hereinafter "test equipment 305") may implement functionalities of a next Generation NodeB (gNB) emulator in the context of testing. The gNodeB emulator can be referred to as an emulator for a base station (BS), access node (AN), NodeB, evolved NodeB (eNB), RAN node, serving cell, and neighbour cell. The test equipment (TE) 305 may be connected to a plurality of measurement antennas 310. The plurality of measurement antennas 310 may be placed in an anechoic chamber 315. The measurement antennas 310 may be capable of operating in single or dual polarization. The number of measurement antennas required in a multiple-input-multiple-output (MIMO) demodulation test is determined by the MIMO applications. For example, a 2×2 MIMO demodulation test may require two measurement antennas; a 4×4 MIMO demodulation test may require four measurement antennas, and so on and so forth.

A device under test (DUT) 320 may be placed in the anechoic chamber 315 for OTA tests. The DUT 320 may be a smart phone, laptop mounted equipment (for example, a plug-in device like a Universal Serial Bus (USB) dongle), laptop embedded equipment, tablet, wearable device, vehicular mounted device, customer premise equipment (CPE), fixed wireless access (FWA) terminal, fixed mounted device, and any other UE-type device. The discussion herein may use the UE 100 as an example of a DUT. A transmission from the measurement antennas 310 to the DUT 320 may be via one or more propagation channels 325. The propagation channels 325 refer to all of the possible links between each measurement antenna and each baseband port/receiver chain of the UE 100 in the anechoic chamber 315. Meanwhile, a link antenna 330 may be collocated with the measurement antennas 310 to establish a stable uplink communication between the DUT 320 and the TE 305. In contrast to the links between the measurement antennas 310 and DUT 320 that may not be always connected or vary in path loss, this stable uplink may be always connected during the test procedure and have constant pass loss. The link antenna 330 may be separately placed with the measurement antennas 310 in the anechoic chamber 315. In some embodiments, the link antenna 330 may further provide a communication connection from the TE 305 to the DUT 320. The communication connection may be via LTE communications, NR communications, or other wireless communications. Any type of positioning system may be used to position the DUT 320 relative to the measurement antennas 310 and the link antenna 330 in desired configurations.

In some embodiments, the TE 305 may implement a test interface (TI) 335 to connect and control the link antenna 330. The TI 335 may further connect and control the plurality of measurement antennas 310.

It is noted that a number of physical antenna elements of the UE may exceed a number of receiver chains of the UE 100. Thus, the propagation channels 325 encompass effects of signal propagation over the air between the measurement antennas 310 and UE antennas, as well as effects of the antenna array feeding network 125, RF processing circuitry 120, and if applicable, IF processing circuitry 115.

Figure 4C:
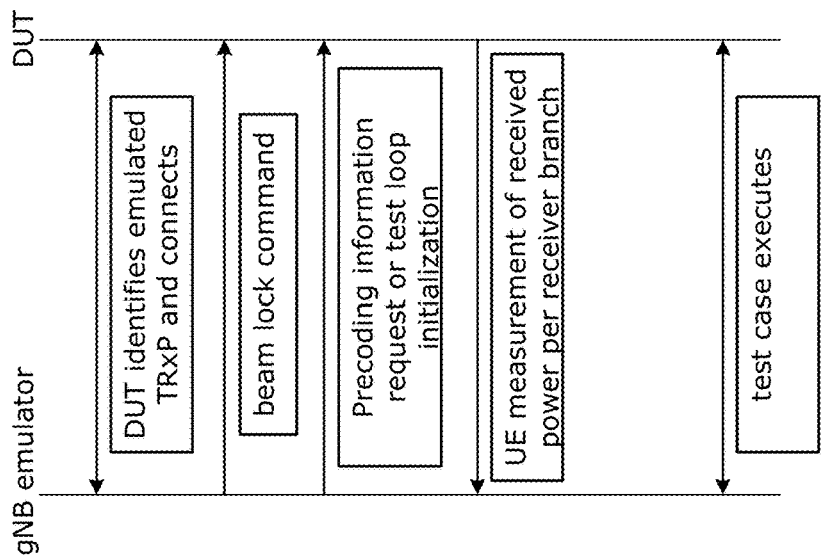
FIGS. 4A, 4B, and 4C illustrate various demodulation test procedures to facilitate proper channel emulation in accordance with various embodiments.
Figure 4B:
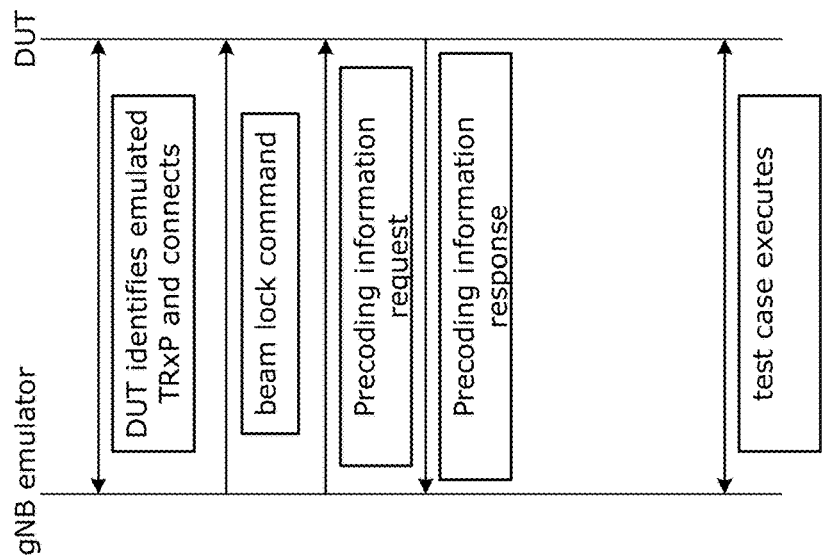
Figure 4A:
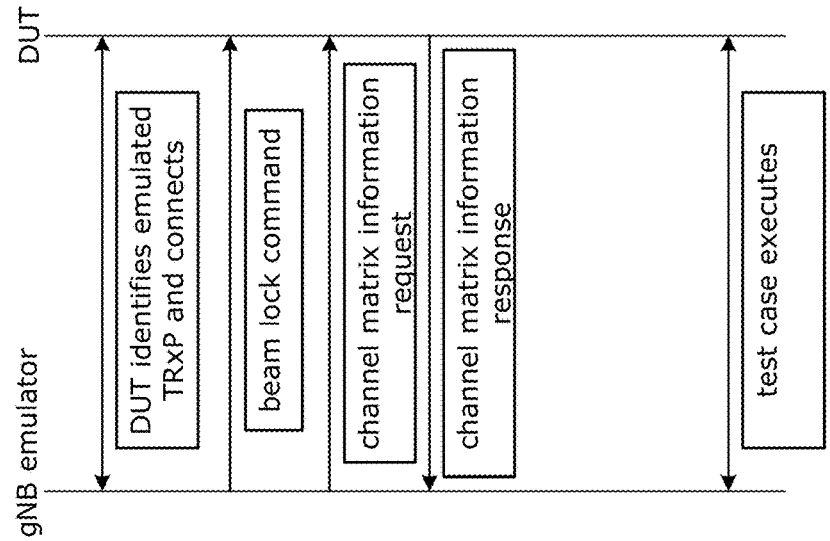

FIGS. 4A, 4B, and 4C illustrate various demodulation test procedures to facilitate proper channel emulation, in which the TE 305 may acquire information regarding receive antenna pattern of the DUT 320 and receive signal characteristics. A gNB emulator or a similar test equipment, collectively a TE 305, and a UE 100 under test may establish links for OTA measurements by TE emulation of one or more transmission and reception points (TRxP) and identifying respective TRxPs by the UE 100 under test. The TE 305 may provide beam lock command to the UE 100 under test so that the UE 100 under test may not change its receive or transmit beamforming configuration during the test, which may simplify test complexity. The TE 305 may request the UE 100 under test to provide feedback on receive (RX) signal characteristics. Such RX signal characteristics may include, but are not limited to, antenna information of the UE 100 under test, channel matrix information from the UE 100 under test, and/or precoding information. In some embodiments, the TE 305 may request the UE 100 for test loop initialization. Detailed descriptions regarding the above-mentioned requests are discussed later. Upon the request sent by the TE 305, the UE 100 under test may perform RX measurements and provide measurement results back to the TE 305 via the link antenna 330 and TI 335. The TE 305 may adjust its transmit (TX) signal characteristics to emulation signals for tests so that a link from one of the measurement antennas 310 to one receiver branch results in better isolation for test case executions. With such a better isolation, a specific link can be less interfered by other propagation channels so that high accuracy OTA tests can be achieved.

In some embodiments, the TE 305 may request antenna information to determine RX signal characteristics. The TE 305 or a gNB emulator may request the UE 100 under test for channel matrix information, as shown in FIG. 4A. Upon such a request, the UE 100 under test may estimate a channel matrix or channel transfer function by utilizing received reference signals. The estimation may be performed with different granularity in frequency domain. For example, a frequency selective measurement may be performed with one estimate per physical resource block (PRB), or a wideband measurement may be performed utilizing reference signals across a broader frequency spectrum. In response to the channel matrix information request, the UE 100 under test may report the channel matrix information to the TE 305. The channel matrix information may be reported in different forms, such as quantized estimate of channel matrix or quantized inverted channel matrix. Some other forms may also be considered if, for example, they help reduce signaling overhead.

In some embodiments, the TE 305 or a gNB emulator may request the DUT 320 or the UE 100 under test for precoding information or test loop initialization, as shown in FIGS. 4B and 4C. Upon such a request, the UE 100 under test may perform RX measurements based on the received reference signals. The reference signals may be downlink reference signals. The UE 100 under test may estimate a channel matrix in frequency domain as discussed above. The UE 100 under test may estimate beamforming or precoding weights with respect to the TE 305, so that the TE 305 may use the estimated weights to precode TX beams to isolate a link from a measurement antenna to a receiver branch from other measurement antenna propagations. In some embodiments, the UE 100 under test may perform reference signal received power (RSRP) measurement with respect to each receiver branch, or baseband chain. The UE 100 under test may also report each measured RSRP regarding each receiver branch back to the TE 305 in response to precoding information request. The UE 100 under test may transmit a message to report the precoding information via the test interface 335. When the reference signal for RSRP measurement is NR synchronization signal (SS), the conventional SS-RSRP measurement report may include only one value among a plurality of measured RSRP values with respect to a plurality of receiver branches, which may not fulfill the purposes of requesting precoding information to isolate links for baseband demodulation tests. Thus, a new type of measurement may be needed to provide individual RSRP values with respect to individual receiver branches. Therefore, the UE under test may report SS-RSRP per receiver branch (SS-RSRPB) via the test interface 335 in response to a precoding information request or test loop initialization.

It is noted that the reference signal for measurements of SS-RSRPB may include but not limited to a synchronization signal (SS) including a secondary SS (SSS), physical broadcast channel (PBCH) demodulation reference signal (DMRS), channel state information reference signal (CSI-RS).

The reference signal for measurements of other channel matrix information and other precoding information may include but not limited to a synchronization signal (SS) including primary and secondary SS, PBCH DMRS, CSI-RS, tracking reference signals (CSI-RS for tracking), physical downlink shared channel (PDSCH) demodulation reference signals (DMRS).

In some embodiments, the SS-RSRPB may be defined as the linear average over the power contributions (in watt [W]) of the resource elements that carry secondary synchronization signals (SS). The measurement time resource(s) for SS-RSRPB may be confined within SS/PBCH Block Measurement Time Configuration (SMTC) window duration. Demodulation reference signals for PBCH and, if indicated by higher layers, CSI reference signals in addition to secondary synchronization signals may be used for SS-RSRPB determination or measurements. SS-RSRPB using demodulation reference signal for PBCH or CSI reference signal may be measured by linear averaging over the power contributions of the resource elements that carry corresponding reference signals taking into account power scaling for the reference signals as defined in 3GPP TS 38.213, v1.0.0 (September 2017). SS-RSRPB may be measured only among the reference signals corresponding to SS/PBCH blocks with the same SS/PBCH block index and the same physical-layer cell identity. If higher-layers indicate certain SS/PBCH blocks for performing SS-RSRPB measurements, SS-RSRPB may be measured only from the indicated set of SS/PBCH block(s). Table 1 shows further description with respect to SS-RSRPB.

It is noted that SS-RSRPB measurements for FR2 may concern measurements at each receiver branch of the UE 100 based on the beamformed and/or combined signal from UE antenna elements, and may report measurements corresponding to each receiver branch of the UE 100. This is different from existing SS-RSRP measurements, which may report only one measured value among all receiver branches.

TABLE 1

SS-RSRPB definition

| | |
|---|---|
| Definition | SS reference signal received power per branch (SS-RSRPB) is defined as the linear average over the power contributions (in [W]) of the resource elements that carry secondary synchronization signals (SS). The measurement time resource(s) for SS-RSRPB are confined within SS/PBCH Block Measurement Time Configuration (SMTC) window duration. For SS-RSRPB determination demodulation reference signals for physical broadcast channel (PBCH) and, if indicated by higher layers, CSI reference signals in addition to secondary synchronization signals may be used. SS-RSRPB using demodulation reference signal for PBCH or CSI reference signal shall be measured by linear averaging over the power contributions of the resource elements that carry corresponding reference signals taking into account power scaling for the reference signals as defined in 3GPP TS 38.213. SS-RSRPB shall be measured only among the reference signals corresponding to SS/PBCH blocks with the same SS/PBCH block index and the same physical-layer cell identity. If higher-layers indicate certain SS/PBCH blocks for performing SS-RSRPB measurements, then SS-RSRPB is measured only from the indicated set of SS/PBCH block(s). For frequency range 1, SS-RSRPB is not defined. For frequency range 2, SS-RSRPB shall be measured for each receiver branch based on the combined signal from antenna elements corresponding to the receiver branch. |
| Applicable for | RRC_CONNECTED intra-frequency |

NOTE 1:
The number of resource elements within the measurement period that are used by the UE to determine SS-RSRPB is left up to the UE implementation with the limitation that corresponding measurement accuracy requirements have to be fulfilled.
NOTE 2:
The power per resource element is determined from the energy received during the useful part of the symbol, excluding the CP.

Figure 5B:
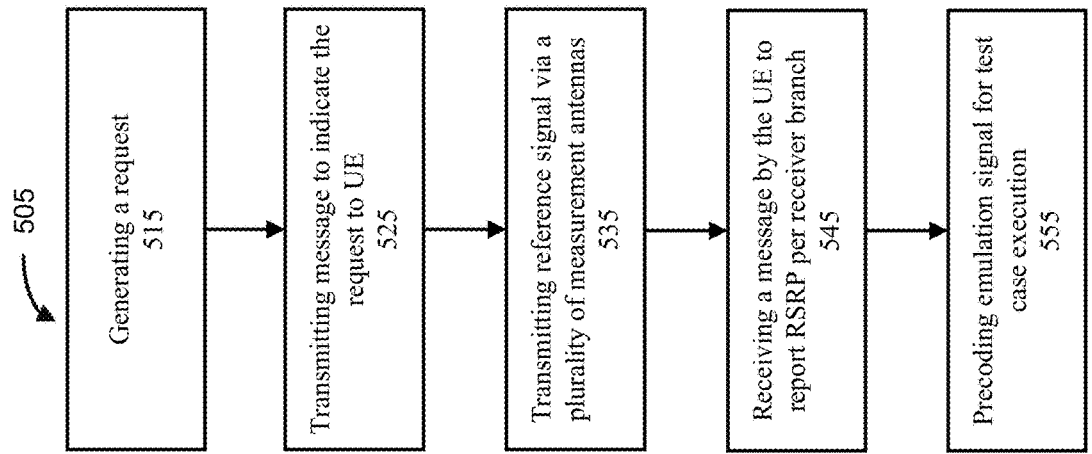
FIG. 5B illustrates an operation flow/algorithmic structure to facilitate the process of test loop initialization by a test equipment (TE) in accordance with some embodiments.
Figure 5A:
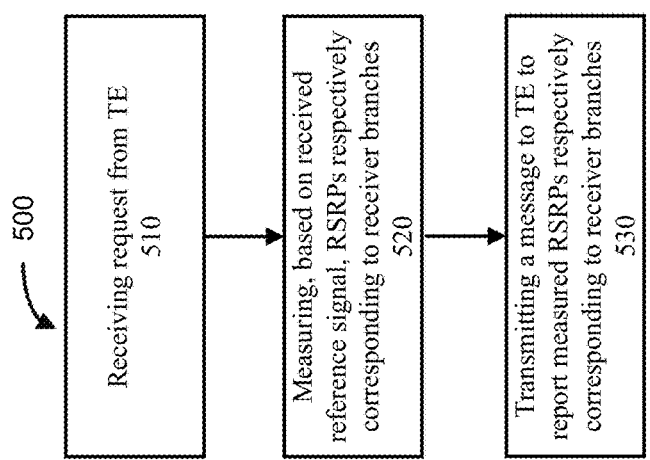
FIG. 5A illustrates an operation flow/algorithmic structure to facilitate a process of test loop initialization by a UE with some embodiments.

FIG. 5A illustrates an operation flow/algorithmic structure 500 to facilitate a process of test loop initialization by the UE 100 in accordance with some embodiments. The operation flow/algorithmic structure 500 may be performed by the UE 100 or circuitry thereof. For example, in some embodiments the operation flow/algorithmic structure 500 may be implemented by digital baseband circuitry 204 and a CPU 204E.

The operation flow/algorithmic structure 500 may include, at 510, receiving a request from a TE. The request may be a request for the UE 100 under test to conduct receiving measurements, to provide UE RX antenna information, to estimate channel matrix information, to estimate precoding information, and/or to request a test loop initialization. The request may be transmitted via the test interface 335 by the link antenna 330 and the UE 100 under test may receive the request via the test interface 335 by the link antenna 330 in a test loop initialization. In some embodiments, the request may be transmitted via measurement antennas 310.

The operation flow/algorithmic structure 500 may further include, at 520, measuring, based on received at least one reference signal from at least one measurement antenna of the TE, one or more RSRPs respectively corresponding to one or more receiver branches. The reference signal may be an SS including SSS and PSS, PBCH-DMRS, and/or CSI-RS. In accordance, measurements with respect to each receiver branch of the UE 100 are SS-RSRP per receiver branch (SS-RSRPB) and/or CSI-RSRP per receiver branch (CSI-RSRPB). The reference signal may be transmitted by the measurement antennas 310 and the measurement antennas 310 may constitute MIMO communications in NR. The UE 100 under test may receive the reference signal with a fixed receive-beam configuration. Such a fixed receive-beam configuration may simplify test complexity by disallowing the UE 100 under test to adjust receive beam configuration. In some embodiments, the UE 100 under test may estimate a channel matrix or channel transfer function based on the reference signal measurements.

The operation flow/algorithmic structure 500 may further include, at 530, transmitting a message to the TE 305 to report the measured RSRPs respectively corresponding to UE receiver branches. In some embodiments, the UE 100 under test may report the estimated channel matrix information or precoding information upon the request sent by the TE 305. Depending on the received reference signals, the UE 100 under test may report SS-RSRPB and/or CSI-RSRPB. In some embodiments, the UE 100 under test may have more than one receiver branch. Therefore, more than one SS-RSRPB and/or CSI-RSRPB value may be reported. The signaling associated with reporting SS-RSRPB and/or CSI-RSRPB may allow the UE 100 under test to report a vector of values, wherein the number of the reported values equals to the number of receiver branches of the UE 100 under test.

In some embodiments, the UE 100 under test may further receive emulation signals for test case executions. The emulation signals may be generated by the TE 305 based on precoding the emulation signals to isolate individual links for UE OTA measurements. Each link may be from one of the measurement antennas 310 to one of the UE receiver branches.

FIG. 5B illustrates an operation flow/algorithmic structure 505 to facilitate the process of test loop initialization by the TE 305 in accordance with some embodiments. The operation flow/algorithmic structure 505 may be performed by the TE 305 or circuitry thereof. For example, in some embodiments the operation flow/algorithmic structure 505 may be implemented by digital baseband circuitry 204 and a CPU 204E.

The operation flow/algorithmic structure 505 may include, at 515, generating a request. The request may be a request for the UE 100 under test to conduct receiving measurements, to provide UE RX antenna information, to estimate channel matrix information, to estimate precoding information, and/or to request a test loop initialization. The request may be transmitted via the test interface 335 by the link antenna 330 and the UE 100 under test may receive the request via the test interface 335 by the link antenna 330 in a test loop initialization.

The operation flow/algorithmic structure 505 may further include, at 525, transmitting a message to indicate the request to the UE 100. The transmission of the message may be via the test interface 335 or by a test loop initialization. In some embodiments, the transmission of the message may be via measurement antennas 310.

The operation flow/algorithmic structure 505 may further include, at 535, transmitting reference signal via the plurality of measurement antennas 310. The TE 305 may perform certain TX beamforming configuration to the reference signal. The reference signal may be an SS including SSS or PSS, PBCH-DMRS, and/or CSI-RS.

The operation flow/algorithmic structure 505 may further include, at 545, receiving a message by the UE 100 under test to report RSRP per receiver branch. The message may include SS-RSRPB, and/or CSI-RSRPB. The message may also include estimated channel matrix information. The message may be received by the TE 305 via the test interface 335.

The operation flow/algorithmic structure 505 may further include, at 555, precoding emulation signals for test case executions. The TE 305 may adjust or precode emulation signals for test case executions based on the measurement results or channel matrix estimations received in the message. The TE 305 may calculate channel matrix and precode vectors associated with emulation signals to provide or improve isolation among individual propagation channels, or links wirelessly connecting a measurement antenna to a receiver branch. The precoded emulation signals may better isolate individual links for OTA measurements. Each link may be defined as from one of the measurement antennas 310 to one of the UE receiver branches.

In some embodiments, the measurement antennas 310 may transmit and receive in orthogonal polarizations, such as in vertical and horizontal polarizations, and the UE receive antennas may be capable of coupling to vertical and horizontal polarizations with significant isolation between the polarizations. For example, the UE 100 may implement an array of patch antennas that can couple to orthogonal polarization modes with high isolation. In accordance, the TE 305 may precode the emulation signals to achieve sufficient isolation among the links by utilizing power-based precoding techniques, without phase precoding to the emulation signals.

In some embodiments, the TE 305 may send a command to the DUT to identify emulated transmission/reception point (TRxP) and connect in the context of emulated OTA tests. The UE 100 under test may communicate back with the TE 305 to provide the required information prior to, or in the beginning of a test loop initialization. Such a communication may be via test interface 335.

In some embodiments, the TE 305 may command a beam lock command to the DUT 320 or the UE 100 under test. The beam lock command may lock the DUT 320 or the UE 100 under test with an unchanged UE receive-beam configuration and/or transmit-beam configuration throughout the pertinent OTA tests. This may simplify OTA test complexity.

In some embodiments, the test loop initialization and pertinent baseband demodulation tests may be conducted while the UE 100 under test is in RRC_CONNECTED state. The beam lock command may also be conducted while the UE 100 under test is in RRC_CONNECTED state.

Figure 6:
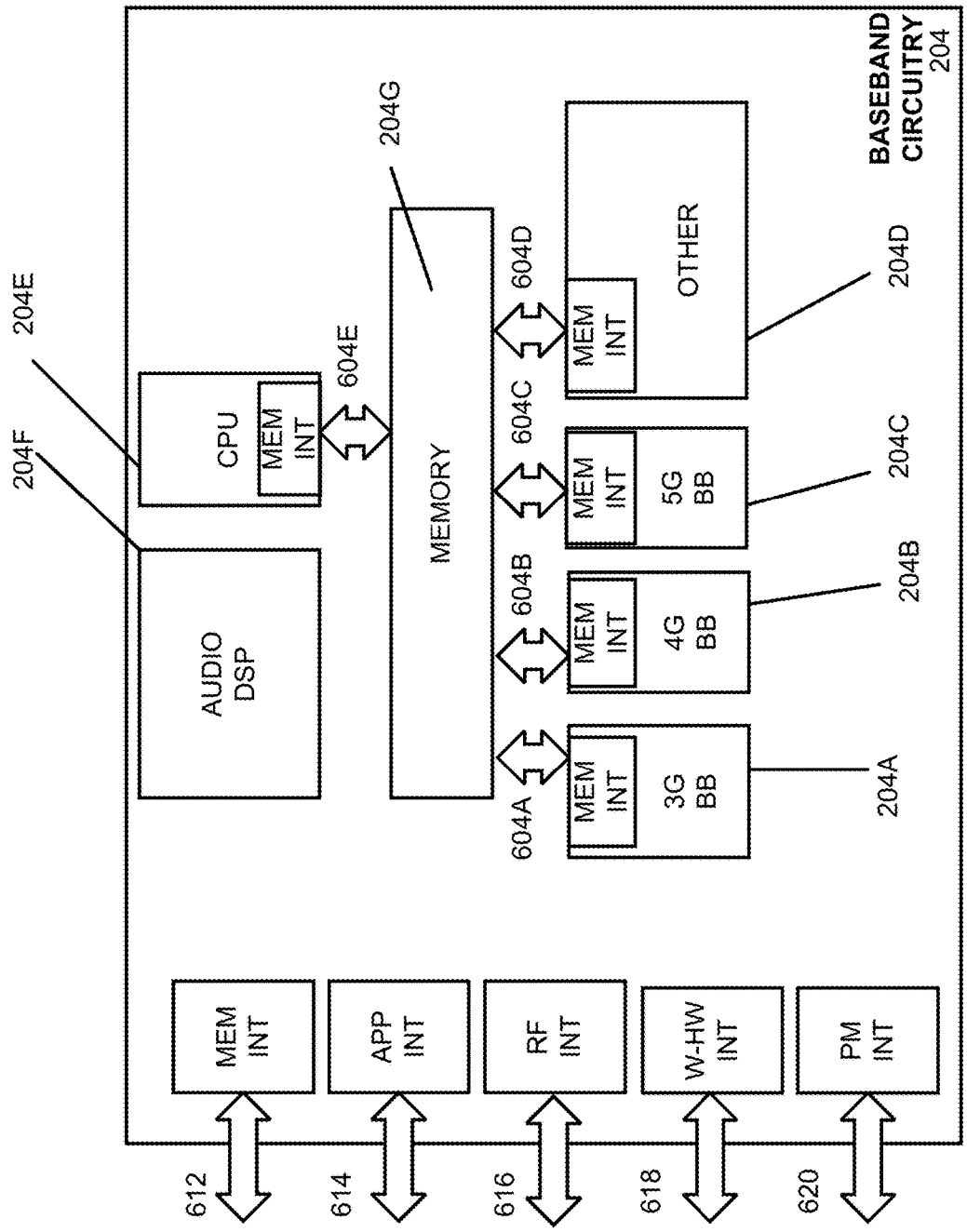
FIG. 6 illustrates example interfaces of baseband circuitry in accordance with some embodiments.

FIG. 6 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 604A-604E, respectively, to send/receive data to/from the memory 204G.

The baseband circuitry 204 may further include one or more interfaces to communicatively couple to other circuitries/devices, such as a memory interface 612 (for example, an interface to send/receive data to/from memory external to the baseband circuitry 204), an application circuitry interface 614 (for example, an interface to send/receive data to/from the application circuitry 202 of FIG. 2), an RF circuitry interface 616 (for example, an interface to send/receive data to/from RF circuitry 206 of FIG. 2), a wireless hardware connectivity interface 618 (for example, an interface to send/receive data to/from Near Field Communication (NFC) components, Bluetooth® components (for example, Bluetooth® Low Energy), Wi-Fi® components, and other communication components), and a power management interface 620 (for example, an interface to send/receive power or control signals).

Figure 7:
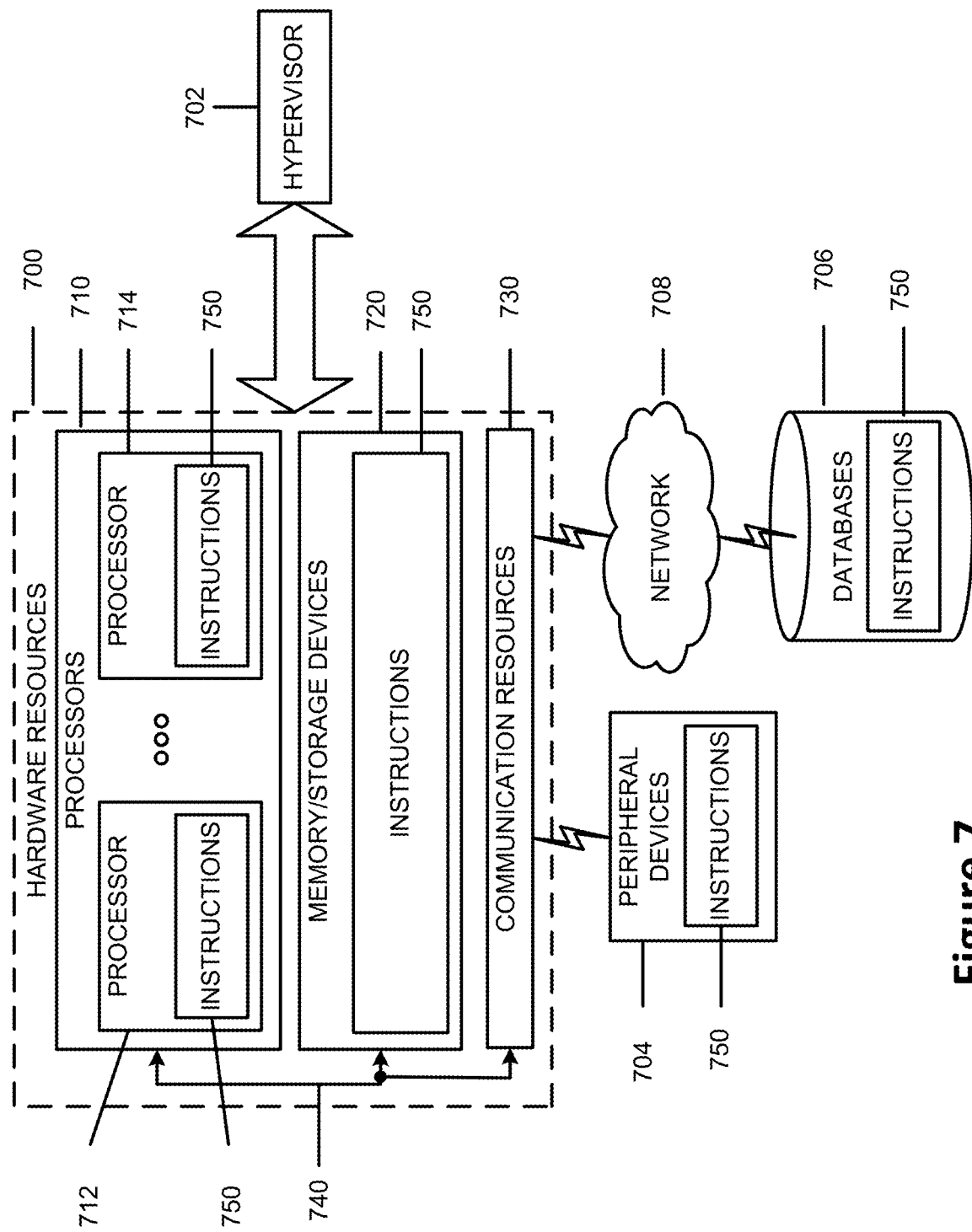
FIG. 7 illustrates hardware resources in accordance with some embodiments.

FIG. 7 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (for example, network function virtualization (NFV)) is utilized, a hypervisor 702 may be executed to provide an execution environment for one or more network slices/sub-slices to utilize the hardware resources 700.

The processors 710 (for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (for example, for coupling via a Universal Serial Bus (USB)), cellular communication components, NFC components, Bluetooth® components (for example, Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein. For example, in an embodiment in which the hardware resources 700 are implemented into the UE 100, the instructions 750 may cause the UE to perform some or all of the operation flow/algorithmic structure 500. In other embodiments, the hardware resources 700 may be implemented into the TE 305. The instructions 750 may cause the TE 305 to perform some or all of the operation flow/algorithmic structure 505. The instructions 750 may reside, completely or partially, within at least one of the processors 710 (for example, within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Some non-limiting Examples of various embodiments are provided below.

Example 1 may include one or more non-transitory computer-readable media comprising instructions to, upon execution of the instructions by one or more processors of a UE, cause the UE to: receive a request from a test equipment (TE) via a test interface (TI); measure, based on at least one reference signal received from at least one measurement antenna of the TE, one or more reference signal received powers (RSRPs) that respectively correspond to one or more receiver branches of the UE; and transmit a message to the TE to report the measured one or more RSRPs.

Example 2 may include the one or more non-transitory computer-readable media of example 1 and/or some other example herein, wherein the request is to request the UE to perform a receive measurement or initialize a test loop.

Example 3 may include the one or more non-transitory computer-readable media of example 1 and/or some other example herein, wherein the TE is associated with a link antenna via the TI.

Example 4 may include the one or more non-transitory computer-readable media of example 1 and/or some other example herein, wherein the request is to request precoding information from the UE, the precoding information to enable the TE to precode transmit (TX) reference signals for test cases.

Example 5 may include the one or more non-transitory computer-readable media of example 1 and/or some other example herein, wherein the at least one reference signal is at least one synchronization signal (SS) including a secondary synchronization signal (SSS) and the measurement of the one or more RSRPs is to measure one or more SS-RSRPs that respectively correspond to the one or more receiver branches to obtain SS-RSRP per receiver branch (SS-RSRPB) of the UE.

Example 6 may include the one or more non-transitory computer-readable media of example 5 and/or some other example herein, wherein, upon execution, the instructions are to further cause the UE to transmit a message to report the SS-RSRPB to the test equipment via the TI or a test loop.

Example 7 may include the one or more non-transitory computer-readable media of example 5 and/or some other example herein, wherein the SS includes at least one secondary SS (SSS) and at least one physical broadcast channel (PBCH) demodulation reference signal (DMRS).

Example 8 may include the one or more non-transitory computer-readable media of example 1 and/or some other example herein, wherein the at least one secondary synchronization signal (SSS), at least one physical broadcast channel (PBCH) demodulation reference signal (DMRS), and at least one channel state information-reference signal (CSI-RS) and the measurement of the one or more RSRPs is to measure one or more synchronization signal RSRP per receiver branch (SS-RSRPB) of the UE.

Example 9 may include the one or more non-transitory computer-readable media of example 1 and/or some other example herein, wherein, upon execution, the instructions are to further cause the UE to process at least one precoded emulation signal to conduct test cases in which at least one link from one of the measurement antennas to one of the one or more receiver branches is isolated from transmissions by other measurement antennas.

Example 10 may include the one or more non-transitory computer-readable media of example 1 and/or some other example herein, wherein, upon execution, the instructions are to further cause the UE to block UE receive-beam function so that a UE receive-beamforming configuration is unchanged.

Example 11 may include the one or more non-transitory computer-readable media of example 1 and/or some other example herein, wherein, upon execution, the instructions are to further cause the UE to determine, based on the received at least one reference signal, a channel matrix or channel transfer function in frequency domain.

Example 12 may include the one or more non-transitory computer-readable media of example 11 and/or some other example herein, wherein the determination of the channel matrix is based on a frequency selective measurement or a wideband measurement.

Example 13 may include the one or more non-transitory computer-readable media of example 11 and/or some other example herein, wherein, upon execution, the instructions are to further cause the UE to transmit a message to the TE to report the determined channel matrix.

Example 14 may include one or more non-transitory computer-readable media comprising instructions to, upon execution of the instructions by one or more processors of a TE, cause the TE to: generate a request for test loop initialization; transmit a first message to indicate the generated request to a user equipment (UE); transmit at least one reference signal via a plurality of measurement antennas; and process a second message, received via a link antenna, to determine a reference signal received power (RSRP) per receiver branch of the UE.

Example 15 may include the one or more non-transitory computer-readable media of example 14 and/or some other example herein, wherein, upon execution, the instructions are to further cause the TE to precode at least one emulation signal based on one or more RSRPs that respectively correspond to one or more receiver branches of the UE.

Example 16 may include the one or more non-transitory computer-readable media of example 15 and/or some other example herein, wherein the plurality of measurement antennas transmit and receive in orthogonal polarizations, and the precoding of the at least one emulation signal is to precode amplitude of the emulation-signal and maintain phase magnitude of the emulation-signal unchanged.

Example 17 may include the one or more non-transitory computer-readable media of example 14 and/or some other example herein, wherein the request is to request the UE to perform a receive measurement.

Example 18 may include the one or more non-transitory computer-readable media of example 14 and/or some other example herein, wherein the request is to request the UE to initialize a test loop.

Example 19 may include the one or more non-transitory computer-readable media of example 14 and/or some other example herein, wherein the at least one reference signal is at least one synchronization signal (SS) and the RSRP per receiver branch of the UE is an SS-RSRP per receiver branch (SS-RSRPB).

Example 20 may include the one or more non-transitory computer-readable media of example 14 and/or some other example herein, wherein the link antenna provides a stable uplink connection between the UE and the TE.

Example 21 may include an apparatus comprising: one or more baseband processors to receive at least one synchronization signal (SS) transmitted by at least one measurement antenna of a test equipment (TE); and a central processing unit (CPU) coupled with the one or more baseband processors, the CPU to measure, based on the at least one SS, the SS-RSRPB, and generate a message to report measured SS reference signal received power per receiver branch (SS-RSRPB).

Example 22 may include the apparatus of example 21 and/or some other example herein, wherein the request is to request the UE to perform a receive measurement or initialize a test loop.

Example 23 may include the apparatus of example 21 and/or some other example herein, wherein the TE is associated with a link antenna via the TI.

Example 24 may include the apparatus of example 21 and/or some other example herein, wherein the request is to request precoding information from the UE, the precoding information to enable the TE to precode transmit (TX) reference signals for test cases.

Example 25 may include the apparatus of example 21 and/or some other example herein, wherein the at least one reference signal is at least one synchronization signal (SS) including a secondary synchronization signal (SSS) and the measurement of the one or more RSRPs is to measure one or more SS-RSRPs that respectively correspond to the one or more receiver branches to obtain SS-RSRP per receiver branch (SS-RSRPB) of the UE.

Example 26 may include the apparatus of example 25 and/or some other example herein, wherein the CPU is further to transmit a message to report the SS-RSRPB to the test equipment via the TI or a test loop.

Example 27 may include the apparatus of example 25 and/or some other example herein, wherein the SS includes at least one secondary SS (SSS) and at least one physical broadcast channel (PBCH) demodulation reference signal (DMRS).

Example 28 may include the apparatus of example 21 and/or some other example herein, wherein the at least one secondary synchronization signal (SSS), at least one physical broadcast channel (PBCH) demodulation reference signal (DMRS), and at least one channel state information-reference signal (CSI-RS) and the measurement of the one or more RSRPs is to measure one or more synchronization signal RSRP per receiver branch (SS-RSRPB) of the UE.

Example 29 may include the apparatus of example 21 and/or some other example herein, wherein the one or more baseband processors are further to receive at least one precoded emulation signal to conduct test cases in which at least one link from one of the measurement antennas to one of the one or more receiver branches is isolated from transmissions by other measurement antennas.

Example 30 may include the apparatus of example 21 and/or some other example herein, wherein the CPU is further to block UE receive-beam function so that a UE receive-beamforming configuration is unchanged.

Example 31 may include the apparatus of example 21 and/or some other example herein, wherein the CPU is further to determine, based on the received at least one reference signal, a channel matrix or channel transfer function in frequency domain.

Example 32 may include the apparatus of example 31 and/or some other example herein, wherein the determination of the channel matrix is based on a frequency selective measurement or a wideband measurement.

Example 33 may include the apparatus of example 31 and/or some other example herein, wherein the CPU is further to transmit a message to the TE to report the determined channel matrix.

Example 34 may include an apparatus comprising: a CPU to generate a request for test loop initialization, transmit a first message to indicate the generated request to a user equipment (UE), and process a second message, received via a link antenna, to determine a reference signal received power (RSRP) per receiver branch of the UE; and one or more baseband processors to generate and transmit at least one reference signal via a plurality of measurement antennas.

Example 35 may include the apparatus of example 34 and/or some other example herein, wherein the CPU is further to precode at least one emulation signal based on one or more RSRPs that respectively correspond to one or more receiver branches of the UE.

Example 36 may include the apparatus of example 35 and/or some other example herein, wherein the plurality of measurement antennas transmit and receive in orthogonal polarizations, and the precoding of the at least one emulation signal is to precode amplitude of the emulation-signal and maintain phase magnitude of the emulation-signal unchanged.

Example 37 may include the apparatus of example 34 and/or some other example herein, wherein the request is to request the UE to perform a receive measurement.

Example 38 may include the apparatus of example 34 and/or some other example herein, wherein the request is to request the UE to initialize a test loop.

Example 39 may include the apparatus of example 34 and/or some other example herein, wherein the at least one reference signal is at least one synchronization signal (SS) including a secondary synchronization signal (SSS) and the RSRP per receiver branch of the UE is an SS-RSRP per receiver branch (SS-RSRPB).

Example 40 may include the apparatus of example 34 and/or some other example herein, wherein the link antenna provides a stable uplink connection between the UE and the TE.

Example 41 may include a method comprising: receiving or causing to receive a request from a test equipment (TE) via a test interface (TI); measuring or causing to measure, based on at least one reference signal received from at least one measurement antenna of the TE, one or more reference signal received powers (RSRPs) that respectively correspond to one or more receiver branches of a UE; and transmitting or causing to transmit a message to the TE to report the measured one or more RSRPs.

Example 42 may include the method of example 41 and/or some other example herein, wherein the request is to request the UE to perform a receive measurement or initialize a test loop.

Example 43 may include the method of example 41 and/or some other example herein, wherein the TE is associated with a link antenna via the TI.

Example 44 may include the method of example 41 and/or some other example herein, wherein the request is to request precoding information from the UE, the precoding information to enable the TE to precode transmit (TX) reference signals for test cases.

Example 45 may include the method of example 41 and/or some other example herein, wherein the at least one reference signal is at least one synchronization signal (SS) including a secondary synchronization signal (SSS) and the measurement of the one or more RSRPs is to measure one or more SS-RSRPs that respectively correspond to the one or more receiver branches to obtain SS-RSRP per receiver branch (SS-RSRPB) of the UE.

Example 46 may include the method of example 45 and/or some other example herein, further transmitting or causing to transmit a message to report the SS-RSRPB to the test equipment via the TI or a test loop.

Example 47 may include the method of example 45 and/or some other example herein, wherein the SS includes at least one secondary SS (SSS) and at least one physical broadcast channel (PBCH) demodulation reference signal (DMRS).

Example 48 may include the method of example 41 and/or some other example herein, wherein the at least one secondary synchronization signal (SSS), at least one physical broadcast channel (PBCH) demodulation reference signal (DMRS), and at least one channel state information-reference signal (CSI-RS) and the measurement of the one or more RSRPs is to measure one or more synchronization signal RSRP per receiver branch (SS-RSRPB) of the UE.

Example 49 may include the method of example 41 and/or some other example herein, further processing or causing to process at least one precoded emulation signal to conduct test cases in which at least one link from one of the measurement antennas to one of the one or more receiver branches is isolated from transmissions by other measurement antennas.

Example 50 may include the method of example 41 and/or some other example herein, further blocking or causing to block UE receive-beam function so that a UE receive-beamforming configuration is unchanged.

Example 51 may include the method of example 41 and/or some other example herein, further determining or causing to determine, based on the received at least one reference signal, a channel matrix or channel transfer function in frequency domain.

Example 52 may include the method of example 51 and/or some other example herein, wherein the determination of the channel matrix is based on a frequency selective measurement or a wideband measurement.

Example 53 may include the method of example 51 and/or some other example herein, further transmitting or causing to transmit a message to the TE to report the determined channel matrix.

Example 54 may include a method comprising: generating or causing to generate a request for test loop initialization; transmitting or causing to transmit a first message to indicate the generated request to a user equipment (UE); transmitting or causing to transmit at least one reference signal via a plurality of measurement antennas; and processing or causing to process a second message, received via a link antenna, to determine a reference signal received power (RSRP) per receiver branch of the UE.

Example 55 may include the method of example 54 and/or some other example herein, further precoding or causing to precode at least one emulation signal based on one or more RSRPs that respectively correspond to one or more receiver branches of the UE.

Example 56 may include the method of example 55 and/or some other example herein, wherein the plurality of measurement antennas transmit and receive in orthogonal polarizations, and the precoding of the at least one emulation signal is to precode amplitude of the emulation-signal and maintain phase magnitude of the emulation-signal unchanged.

Example 57 may include the method of example 54 and/or some other example herein, wherein the request is to request the UE to perform a receive measurement.

Example 58 may include the method of example 54 and/or some other example herein, wherein the request is to request the UE to initialize a test loop.

Example 59 may include the method of example 54 and/or some other example herein, wherein the at least one reference signal is at least one synchronization signal (SS) including a secondary synchronization signal (SSS) and the RSRP per receiver branch of the UE is an SS-RSRP per receiver branch (SS-RSRPB).

Example 60 may include the method of example 54 and/or some other example herein, wherein the link antenna provides a stable uplink connection between the UE and the TE.

Example 61 may include an apparatus comprising means to perform one or more elements of a method described in or related to any of examples 41-60, or any other method or process described herein.

Example 62 may include one or more non-transitory computer-readable media comprising instructions to cause an electronic device, upon execution of the instructions by one or more processors of the electronic device, to perform one or more elements of a method described in or related to any of examples 41-60, or any other method or process described herein.

Example 63 may include an apparatus comprising logic, modules, and/or circuitry to perform one or more elements of a method described in or related to any of examples 41-60, or any other method or process described herein.

Example 64 may include a method, technique, or process as described in or related to any of examples 41-60, or portions or parts thereof.

Example 65 may include an apparatus comprising: one or more processors and one or more computer-readable media comprising instructions that, when executed by the one or more processors, cause the one or more processors to perform the method, technique, or process as described in or related to any of examples 41-60, or portions thereof.

The present disclosure is described with reference to flowchart illustrations or block diagrams of methods, apparatuses (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. One or more non-transitory computer-readable media comprising instructions to, upon execution of the instructions by one or more processors of a user equipment (UE), cause the UE to:

measure, based on at least one received reference signal, one or more reference signal received powers (RSRPs) that respectively correspond to one or more receiver branches of the UE; and generate a message to report the measured one or more RSRPs, wherein the at least one reference signal includes at least one synchronization signal (SS) and the measurement of the one or more RSRPs is to measure one or more SS-RSRPs that respectively correspond to the one or more receiver branches to measure SS-RSRP per receiver branch (SS-RSRPB) of the UE.

2. The one or more non-transitory computer-readable media of claim 1, wherein, upon execution, the instructions are further to cause the UE to receive the at least one reference signal from at least one measurement antenna of a test equipment (TE).

3. The one or more non-transitory computer-readable media of claim 1, wherein, upon execution, the instructions are further to cause the UE to receive a request from the TE via a test interface (TI) to perform a measurement or initialize a test loop, wherein the TE is associated with a link antenna via the TI.

4. The one or more non-transitory computer-readable media of claim 3, wherein the request further requests precoding information from the UE, the precoding information to enable the TE to precode transmit (TX) reference signals for test cases.

5. The one or more non-transitory computer-readable media of claim 1, wherein, upon execution, the instructions are to further cause the UE to transmit a message to report the SS-RSRPB to the TE via a test interface (TI) or a test loop.

6. The one or more non-transitory computer-readable media of claim 1, wherein the SS includes at least one secondary SS (SSS) and at least one physical broadcast channel (PBCH) demodulation reference signal (DMRS).

7. The one or more non-transitory computer-readable media of claim 1, wherein the to measure SS-RSRPB is a measurement based on a radio resource control (RRC) connected (RRC_CONNECTED) intra-frequency.

8. The one or more non-transitory computer-readable media of claim 1, wherein the at least one reference signal includes a channel state information-reference signal (CSI-RS) for tracking.

9. The one or more non-transitory computer-readable media of claim 1, wherein, upon execution, the instructions are to further cause the UE to process at least one precoded emulation signal to conduct test cases in which at least one link from one of the measurement antennas to one of the one or more receiver branches is isolated from transmissions by other measurement antennas.

10. The one or more non-transitory computer-readable media of claim 1, wherein, upon execution, the instructions are to further cause the UE to lock UE receive-beam function so that a UE receive-beamforming configuration is unchanged.

11. The one or more non-transitory computer-readable media of claim 1, wherein, upon execution, the instructions are to further cause the UE to determine, based on the received at least one reference signal, a channel matrix or channel transfer function in frequency domain.

12. The one or more non-transitory computer-readable media of claim 11, wherein the determination of the channel matrix is based on a frequency selective measurement or a wideband measurement.

13. An apparatus of a user equipment (UE), comprising:
one or more baseband processors to:
receive at least one synchronization signal (SS) transmitted by at least one measurement antenna of a test equipment (TE), and
generate a message to report measured SS reference signal received per receiver branch (SS-RSRPB); and
a central processing unit (CPU) coupled with the one or more baseband processors, the CPU to measure, based on the at least one SS, the SS-RSRPB.

14. The apparatus of claim 13, wherein the one or more baseband processors are further to receive a request to initialize a test loop.

15. A method of operating a user equipment (UE), comprising:
measuring, based on at least one received reference signal, one or more reference signal received powers (RSRPs) that respectively correspond to one or more receiver branches of the UE; and
generating a message to report the measured one or more RSRPs,
wherein the at least one reference signal includes at least one synchronization signal (SS) and the measurement of the one or more RSRPs is to measure one or more SS-RSRPs that respectively correspond to the one or more receiver branches to measure SS-RSRP per receiver branch (SS-RSRPB) of the UE.

16. The method of claim 15, further comprising receiving the at least one reference signal from at least one measurement antenna of a test equipment (TE).

17. The method of claim 16, further comprising receiving a request from the TE via a test interface (TI) to perform a measurement or initialize a test loop, wherein the TE is associated with a link antenna via the TI.

18. The method of claim 17, wherein the request further requests precoding information from the UE, the precoding information to enable the TE to precode transmit (TX) reference signals for a test case.

19. The method of claim 15, wherein the SS-RSRPB is a measurement based on a radio resource control (RRC) connected (RRC_CONNECTED) intra-frequency.

20. The method of claim 15, wherein the at least one reference signal includes a channel state information-reference signal (CSI-RS) for tracking.

* * * * *